United States Patent [19]

Schmid et al.

[11] Patent Number: 4,646,710

[45] Date of Patent: Mar. 3, 1987

[54] MULTI-WAFER SLICING WITH A FIXED ABRASIVE

[75] Inventors: Frederick Schmid, Marblehead; Chandra P. Khattak, Danvers; Maynard B. Smith, Newburyport, all of Mass.

[73] Assignee: Crystal Systems, Inc., Salem, Mass.

[21] Appl. No.: 491,997

[22] Filed: May 5, 1983

Related U.S. Application Data

[63] Continuation-in-part of Ser. No. 421,120, Sep. 22, 1982, abandoned, which is a continuation of Ser. No. 201,247, Oct. 27, 1980, abandoned.

[51] Int. Cl.[4] .................................................. B28D 1/02
[52] U.S. Cl. ........................................ 125/16 R; 51/65; 83/411 R
[58] Field of Search .............. 125/16 R, 16 L, 12; 51/65; 83/411, 431, 781

[56] References Cited

U.S. PATENT DOCUMENTS

| 460,049 | 9/1891 | Hill | 83/411 R |
|---|---|---|---|
| 1,897,541 | 2/1933 | Van Berkel | 83/411 R |
| 3,066,564 | 12/1962 | Carpenter | 83/411 R |
| 3,154,990 | 11/1964 | Woods | 83/431 |
| 3,239,914 | 3/1966 | Shirakura | 51/65 |
| 3,272,195 | 9/1966 | Meyer | 125/16 R |
| 4,092,972 | 6/1978 | Schmid | 125/16 R |
| 4,187,827 | 2/1980 | Regler | 125/16 R |
| 4,187,828 | 2/1980 | Schmid | 125/18 |

FOREIGN PATENT DOCUMENTS 148261 12/1954 Sweden .................. 83/411 R

Primary Examiner—Harold D. Whitehead

[57] ABSTRACT

A wafering machine having a multiplicity of wire cutting blades supported by a bladehead reciprocally moving past a workpiece supported by a holder that rocks about an axis perpendicular to the wires at a frequency less than the reciprocation of the bladehead.

10 Claims, 7 Drawing Figures

MULTI-WAFER SLICING WITH A FIXED ABRASIVE

This is a continuation in part of U.S. Ser. No. 421,120, filed Sept. 22, 1982, and now abandoned which itself is a continuation of U.S. Ser. No. 29,247 filed Oct. 27, 1980 and now abandoned.

FIELD OF THE INVENTION

The invention relates to the slicing of crystals into wafers using wires blades.

BACKGROUND OF THE INVENTION

The slicing of silicon crystals into wafers suitable for use in photovoltaic cells has typically been carried out by two-body abrasion cutting (i.e., using a blade with abrasive particles bonded to it) or by three-body abrasion cutting (i.e., a process wherein abrasive particles are introduced between a blade and a workpiece, generally as an oil/abrasive particle slurry) Our U.S. Pat. Nos. 4,092,972 and 4,187,828 disclose a modification of these techniques using wire and rectangular blades having abrasive particles fixed in an abrasive-holding portion of the blade that is softer than the workpiece to be cut. The particles extend downward from the bottoms of the blades but not from the sides or top, to avoid waste of the abrasive and to minimize kerf width. Also shown in the patents is charging apparatus for embedding the particles into the lower portions of wires that are strung parallel on a support to form a bladehead, the embedding occurring either before or during cutting of a crystal ingot.

SUMMARY OF THE INVENTION

In general our invention features a wafering machine employing a multiplicity of taut wire cutting blades strung on a bladehead reciprocally moving past a workpiece supported by a holder that rocks about an axis perpendicular to the wires at a frequency less than the reciprocation of the bladehead. This causes a decrease in the contact lengths of the wire blades on the workpiece, resulting in an increase in cutting pressure of the blades without increasing the force applied between the blades and the workpieces, which increase in force would otherwise tend to cause transverse wander of the wire blades. Experiments show that material removal rate drops rapidly as the contact length increases.

In preferred embodiments roller guides for the wire blades are placed near a workpiece support to reduce the unsupported lengths of the blades to also reduce the contact length and minimize transverse wander of the wires; the rocking axis passes through the center region of the workpiece; the rocking axis is located to provide an arc-shaped cut profile with a maximum radius R less than or equal to about $28.648 B/\tan^{-1}(D/L)$, where B is the maximum permissible contact length, D is the deflection of the wire blades, and L is one half of the unsupported lengths of the wire blades; and the rocking angle is about 90°.

In another aspect our invention features a reciprocating wire-blade wafering machine that also employs a rocking workpiece holder and additionally operates above 100 fpm (preferably above 150 fpm and, in the preferred embodiment, above 400 fpm), and employs a relatively light blade tensioning and supporting structure, to decrease the mass that must be accelerated to the high speeds. The lighter accelerated mass is driven through a longer blade stroke, thereby minimizing vibration at the higher speeds and reducing transverse blade wander, which would cause widening of the kerf width. In preferred embodiments the bladehead weight is less than 200 pounds (preferably less than about 50 and in the preferred embodiment about 37 pounds); the blade stroke is greater than 8" (preferably greater than 12" and in the preferred embodiment about 16"); and two bladeheads are connected to operate 180° out of phase, balancing acceleration forces, and therefore using less power and minimizing vibrations at higher speeds.

In another somewhat broader aspect, the invention is not limited to wire blades but is related to cutting machines including other types of blades, e.g., band saw type blades or circular blades, in which there is advantageous rocking of a workpiece relative to the moving blade.

DESCRIPTION OF THE PREFERRED EMBODIMENT

Objects, features, and advantages of the preferred embodiment will appear from the following detailed description of the invention, taken together with the attached drawings. Further information can be obtained from Schmid, F., et al., "Recent Developments in Multi-Wire Fixed Abrasive Slicing Technique (FAST)", Pro. 4th E. C. Photovoltaic Solar Energy Conf., Stresa, Italy (May 10–14, 1982), which is hereby incorporated by reference.

STRUCTURE

Figure 1:
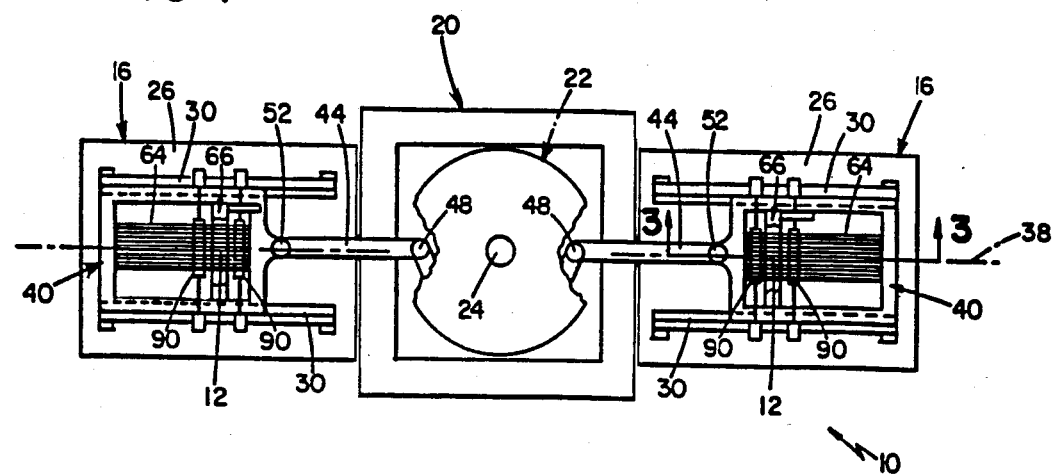
FIG. 1 is a somewhat diagrammatic plan view of a cutting machine embodying the invention with portions of rocker assembies removed.

Referring now to FIG. 1, there is shown in simplified form a cutting machine, generally designated 10, for slicing bar shaped ingots 12 (e.g., each 10 cm×10 cm, 5 cm×5 cm or 15 cm×15 cm cross-section) or cylindrical ingots up to 15 cm diameter cross-section into thin wafers. Machine 10 includes two wafering assemblies 16, mounted on opposite sides of driving assembly 20.

Driving assembly 20 includes a flywheel 22 driven by 3 hp motor (not shown) operably connected to transverse shaft 24. The weight-size-speed relationships of the flywheel provide the desired momentum.

Each wafering assembly includes support bases 26 on which are mounted pairs of bladehead supporting tracks 30. The paired bladehead tracks 30 are parallel to and spaced symmetrically about a line of symmetry 38, which line passes between wafering components 16, and through the axis of flywheel 22.

Mounted on bladehead support slide tracks 30 are 37 lb bladeheads 40. They are operably connected to flywheel 22 through pivotal connections 48 to a Watts type linkage (not shown) used to provide straight line motion for the bladeheads 40.

Figure 2:
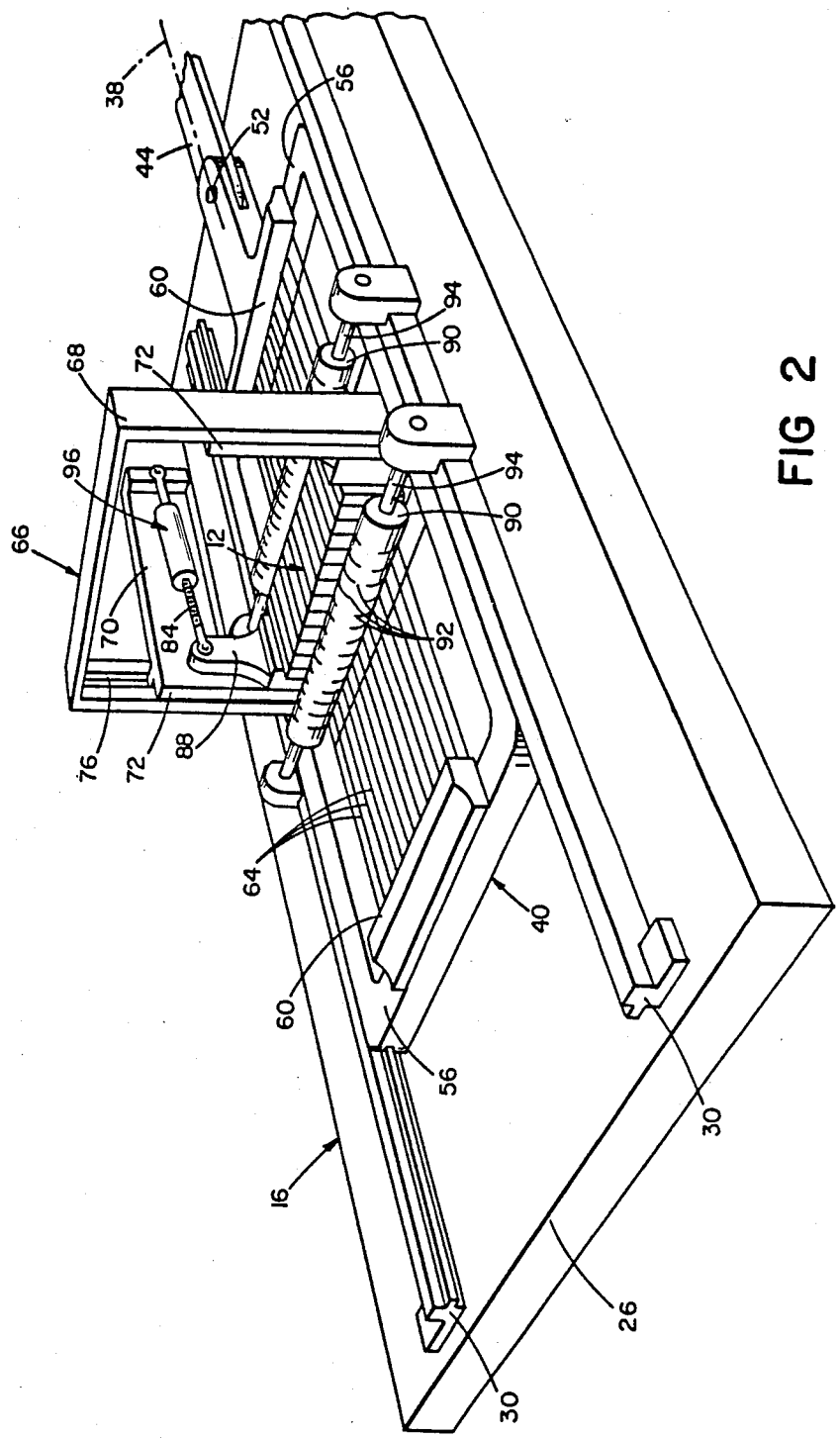
FIG. 2 is a perspective view of a wafering assembly of the machine.

Referring to FIG. 2, there is shown a more detailed view of one of the wafering assemblies 16.

Attached to both ends 56 of bladehead 40 are clamps 60. Between the two clamps 60, a multiplicity of evenly spaced, parallel wire blades 64 are strung at approximately 5.65 lb tension. Wires 64 are 30 inches long and consist of 0.127 mm (5 mil) diameter core wire with 0.018 mm (0.7 mil) copper sheath, impregnated with 30 micron natural diamonds on the lower cutting surface, and plated with 0.008 mm (0.3 mil), electroless nickel. Both the copper and nickel are softer than the ingot to be cut.

Referring to both FIGS. 2 and 3, extending above and below bladehead 56 is ingot support assembly 66, including two vertical supports 68 attached to base 26 between tracks 30 and between the side members of bladehead 40 riding on tracks 30. Sliders 72 are slidably mounted in vertical grooves 76 (only one of which is shown) in supports 68. Ingot holder 88 is pivotally attached about axis 80 to sliding members 72 and has cradle 91 for holding graphite piece 93, which is epoxied to ingot 12. Conventional means (diagrammatically shown as lead screw 95) is used to apply upward pressure, typically of about 0.1 lb per wire, on ingot 12 via sliders 72 and ingot holder 88.

Two Delrin guide rollers 90 are rotatably mounted on shafts 94 over bladehead 56. Shafts 94 are mounted on each side of the ingot support assembly 66 and spaced approximately six inches from each other. Each guide roller 90 is slotted with a multiplicity of circumferential grooves 92, each groove forming a 60° "V" in cross-section. The depth of the grooves depends on the groove spacing. In the illustrated embodiment, there are 48 grooves per axial inch, and each groove is about 0.017 in deep.

Figure 3:
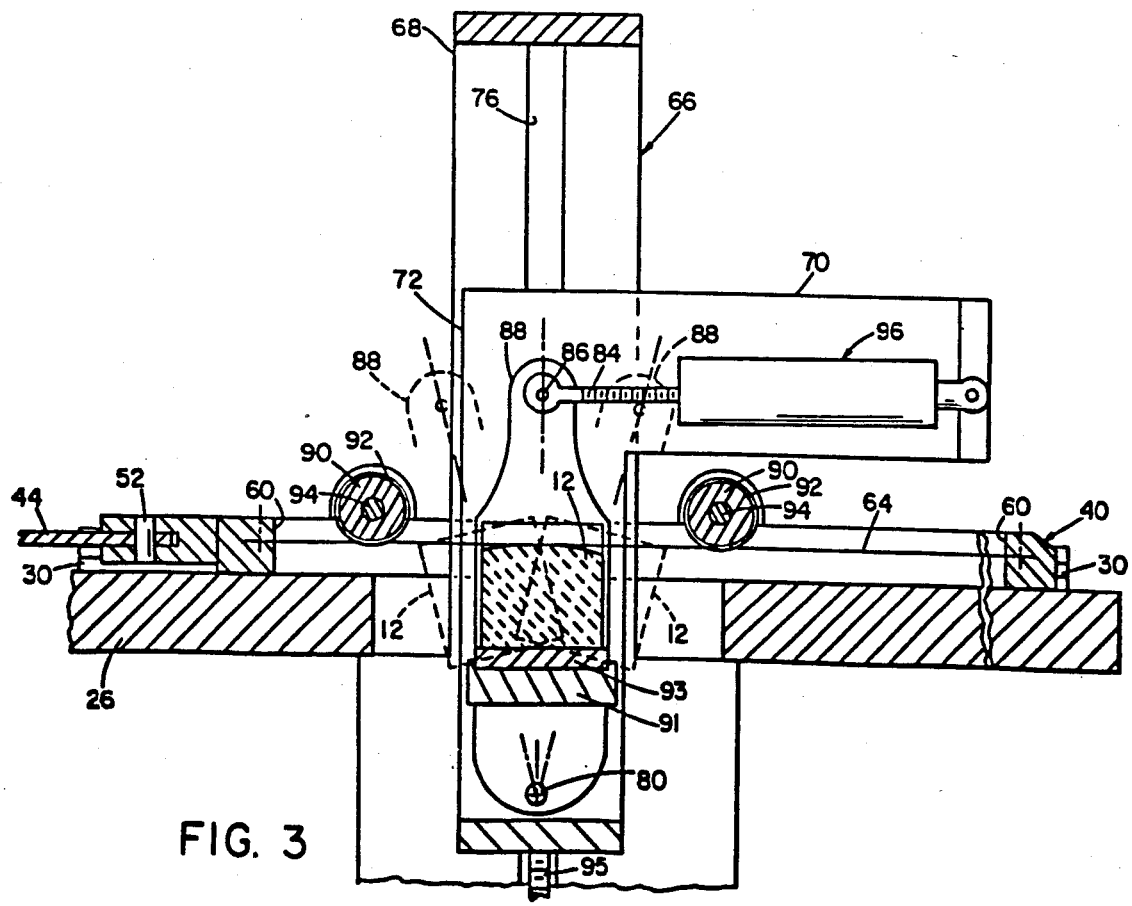
FIG. 3 is a vertical sectional view, taken at 3—3 of FIG. 1, of a rocking assembly of the machine.

Referring to FIG. 3, there is shown a more detailed view of a portion of ingot support assembly 66. Extending horizontally from slider 72 is support frame 70, on which is pivotally mounted, motorized lead screw 96 for rocking ingot holder 88 about axis 80 through an arc, as described in detail below. This is caused by axial displacement of threaded rod 84, which is pivotally connected to holder 88.

Operation

In operation, ingot 12 is placed into ingot holder 88. Flywheel 22 is rotated at 150 rpm, causing driving arms 44 via a Watts linkage alternately to pull inward and to push outward bladeheads 40 at an average speed of 400 fpm. Ingot 12 is pushed upward against the lower surface of reciprocating wire blades 64 by means 95 at a force of about 0.1 lb per wire.

The combination of high pressure and speed are highly desirable in cutting with fixed abrasives. This combination is made possible by rocking the workpiece and utilizing guide rollers and high reciprocating speeds.

As the ingot holder 88 is pushed upwards, it is constrained to move generally vertically, because sliding members 72, on which ingot holder 88 pivots, are constrained to slide along vertical grooves 76. Added to this vertical motion is a rocking motion: threaded rod 84 alternately pushes and pulls the top of ingot holder 88 at a rate of 10 oscillations per minute; ingot holder 88 and ingot 12 rock about axis 80, subtending an arc of about 40°. (See different positions shown in FIG. 3). This rocking shortens the length of blade contacting the ingot, in turn increasing the pressure of the blade against the ingot, in turn increasing the cutting rate. In addition, this shorter contact length decreases lateral blade wandering.

Increasing the speed from 200 fpm to 400 fpm significantly decreases the slicing time by a factor of 2 for a 10 cm ingot. This increase in speed without vibration and blade wander is made possible by increasing the stroke length and also by decreasing the bladehead mass. By using wire blades instead of rectangular blades, the bladehead is made lighter. In addition, since the force needed to tension the blades is less, the bladehead can be even lighter.

Figure 4:
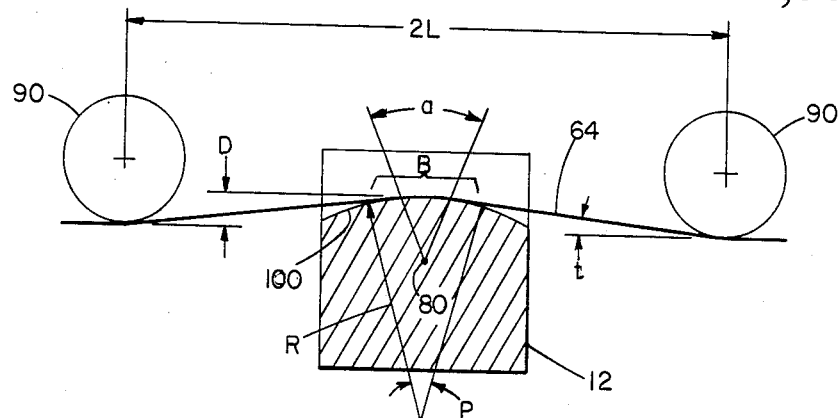
FIG. 4 is a diagrammatic vertical sectional view showing the workpiece, wire blades and rollers of a modified rocking embodiment and the contact length of wire blades on the workpiece.

Blades 64 are constrained within grooves 92 of guide rollers 90, decreasing their unsupported lengths L and therefore the distance D that the wires are deflected by the upward-pushed ingot 12 (FIG. 4). This decreased deflection also minimizes contact of wire with the cut surface and lateral wandering, and narrows kerf width. This in essence increases pressure between the abrasive and cut, in turn increasing the cutting performance.

OTHER EMBODIMENTS

Other embodiments are within the scope of the following claims.

For example, it has been found that 30° V-grooves 90 work very well and tightly hold wire blades 64, and that grooves that are shaped to conform to the shapes of the blades also work very well.

More significantly, it has been found that rocking of the workpieces is very important and can be modified to obtain smaller contact lengths (and thus higher rates of cutting).

The effect of contact length and rocking angle on slicing was examined through the experiments described below.

Figure 5:
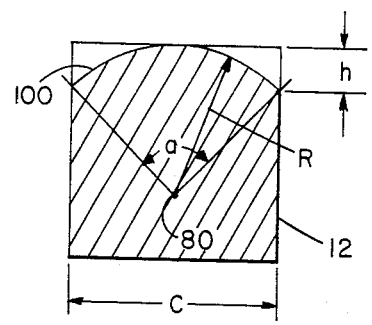
FIG. 5 is a diagrammatic vertical sectional view of a portion of a workpiece during slicing with rocking at a 90° rocking angle.
Figure 6:
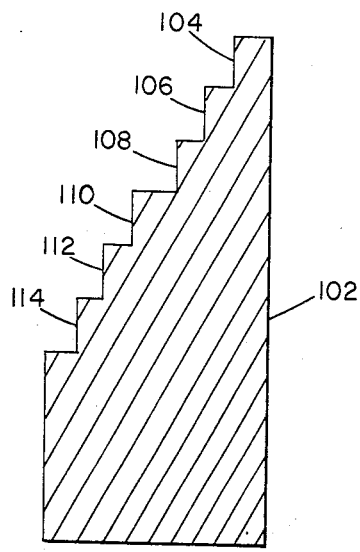
FIG. 6 is a diagrammatic vertical sectional view of a workpiece used in contact length experiments.
Figure 7:
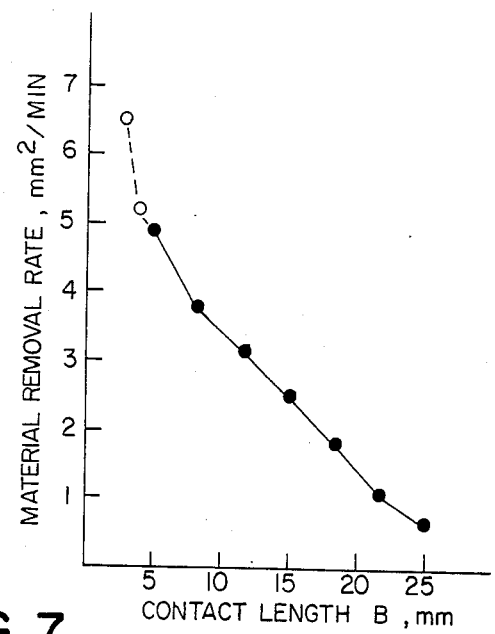
FIG. 7 is a graph of material removal rate vs. contact length for the FIG. 6 workpiece.

Stationary block 102 shown in FIG. 5 was sliced without rocking at an average speed of 97 meters/min to study the slicing rate at different contact lengths at the different steps 104–114 using 225 0.127 mm (5 mil) diameter tungsten wires nickel plated with 30 micron natural diamond to achieve a 0.2 mm (7.87 mil) kerf width. The widths (i.e., the contact lengths) of steps 104–114 were 5.1 mm (0.2 in), 8.4 mm (0.33 in), 11.7 mm (0.46 in), 15.0 mm (0.59 in), 18.3 mm (0.72 in), 21.6 mm (0.85 in) and 22.4 mm (0.88 in) which, at a feed force of 26 gm and a kerf width of 0.2 mm (7.87 mil), correspond to pressures of 25.5, 15.5, 11.1, 8.7, 7.1, 6.0 and 5.2 gms/mm$^2$, respectively. The material removal rate (mm$^2$/min) for each step was calculated by dividing the area cut per wire by the time, and plotted in FIG. 7 as a function of contact length (step width). This plot shows that under the tested conditions, the removal rate is inversely proportional to the contact length or directly proportional to pressure of the wire against the workpiece. For contact lengths lower than 5 mm (0.196 in) the material removal rate increases rapidly, and it is believed that for contact lengths greater than 25 mm (0.984 in), the material removal rate will reduce significantly.

Slicing experiments were also conducted at a 20° and 40° rocking angles using 5 cm×5 cm×9 cm workpieces, with all other parameters the same as with stepblock 102 to study the effect of rocking angle a on the removal rate. The average removal rate for rocking at 20° was 5.125 mm²/min; the average removal rate for 40° rocking was 6.5 mm²/min, and the corresponding radii of curvature for the cut profiles were 12.7 cm and 7.6 cm respectively. Contact lengths of 2.8 mm (0.110 in) and 4.69 mm (0.184 in) for 40° and 20° rocking angles, respectively, were calculated using Equation 3 derived below, where D and L are 1.524 mm (60 mils) and 82.6 mm (3.25 in). The actual material removal rates of 6.5 and 5.1 mm/min for the 2.8 mm (0.110 in) and 4.69 mm (0.184 in) contact lengths are shown on FIG. 7 by circles connected to the step block data by dashed lines.

Slicing experiments were also conducted with 10 cm and 15 cm diameter circular cross-section ingots at a 40° rocking angle, resulting in maximum contact lengths 1 of 5.33 mm (0.209 in) and 8.89 mm (0.350 in), respectively. With the 15 cm ingot, while initial slicing was effective, there was breakage of wafers as slicing progressed, indicating that the maximum acceptable contact length for a 40° rocking angle and 26 gms feed force is between 5.33 mm (0.209 in) and 8.89 mm (0.349 in).

Equations were derived from FIGS. 4 and 5 for determining the rocking needed for a given system to guarantee that one obtains minimum contact length necessary to result in acceptable cutting.

Referring to FIG. 4 (showing rocking that is modified from that of FIG. 3 in that rocking axis 80 passes through the region occupied by ingot 12) the contact length B between wires 64 and ingot 12 is determined by deflection D of wires 64 and the shape (i.e., radius R of curvature) of cut profile 100. The deflection of wires is in turn dependent upon properties of the wires, the feed force (via means 95) and the supported length of wires 64 between guide rollers 90. The radius of curvature of cut profile 100 is in turn dependent on rocking angle a of the workpiece and the location of the rocking axis.

Assuming that the shape of cut profile 100 is an arc of radius R, and that contact length B subtends an angle P (in degrees) at the center, then $$B = P(2\pi R)/360 = PR/57.296. \quad (1)$$

From geometrical considerations, P is equal to twice the angle t of deflection of the wires at the point of contact of the guide roller, or $$P = 2t \cong 2 \tan^{-1}(D/L) \quad (2)$$

where L is the half-distance of the unsupported length of wires between the guide rollers. Combining Equations 1 and 2 results in Equation 3:

$$B \cong 2R \tan^{-1}(D/L)/57.296 \quad (3)$$

The maximum contact length for effective cutting depends upon the particular conditions, i.e., D, L, feed force, surface speed, diamond type and size, etc., as described earlier.

Knowing the maximum cutting length B necessary for effective cutting, one can use Equation 3 to identify the necessary radius of curvature R for cut profile 100 for a given system; specifically R should be less than or equal to 28.648 B/tan⁻¹(D/L).

If the workpiece has a rectangular cross-section, and the rocking angle a is less than 90°, it has been found that R remains constant, even after the cut profile passes through the rocking axis, and that the radius of curvature R is a function of the size of the workpiece based upon geometrical considerations, as shown by Equation (5):

$$R = (c^2 + 4h^2)/8h \quad (5)$$

where:
c = the width of the workpiece, and
h = the distance from the cut profile to a line passing through the junctions of the cut profile with the sides of the ingot, as shown in FIG. 5.

If the rocking angle is 90° about the center of a rectangular cross-section workpiece (FIG. 5), profile radius R is equal to ½ the diagonal of the cross section, and this is desirable because it allows the guide rollers to be spaced close to the workpiece.

As rocking angle decreases, radius R of the cut profile become larger. This results in a longer contact length B, which is undesirable. Therefore, it is desirable to rock at as large an angle as practically possible. By rocking at 180°, the minimum contact length is achieved, but if the workpiece holder is on the bottom of the workpiece, it will be cut by the wires. To avoid this, the workpiece can be supported along its bottom and ends by a graphite cradle that is rocked about its ends; the graphite holds the wafers in place after cutting through the workpiece and partially into the graphite. Rocking of the workpiece at 180° may however require wider spacing of the rollers, to avoid interference of the workpiece holder with the rollers, and this will result in larger deflection.

The rocking concepts described above can also be advantageously applied to other types of blades with cutting surfaces moving through a planar cutting region while the workpiece is moved toward the cutting surface and rocked about an axis that is perpendicular to the planar cutting region and to the axis along which the workpiece is moved. For example, workpieces can be rocked by an angle less than 180° while cutting with both an inner diameter or outer diameter circular blade with embedded diamond particles; this is an improvement over prior cutting of cylindrical workpieces that rotate while being cut by a circular blade, because the final portion that is cut is not at the center of the workpiece (where undesirable stresses may develop) but is at an edge, where it causes less of a problem. When a band saw type blade with embedded diamond particles is used, the rocking acts to decrease the contact length of the blade with the workpiece, resulting in increased pressure and improved cutting.

What is claimed is:
1. A wafering machine comprising
 a bladehead supporting a multiplicity of taut parallel wire cutting blades,
 a support on which said bladehead is mounted for sliding reciprocation along an axis parallel to said wire blades,
 means for reciprocally moving the bladehead along said axis through a stroke,
 a workpiece holder mounted to move perpendicular to said bladehead,
 means for biasing said workpiece holder toward said bladehead, and
 means for rocking the workpiece holder about a rocking axis perpendicular to said blades at a frequency less than that for the reciprocation of said bladehead, to decrease the contact lengths of said blades on said workpiece and thus increase the pressure between said wire blades and workpiece without increasing the force applied to said wire blades by said means for biasing.

2. The machine of claim 1 wherein said workpiece holder has means to secure the bottom of said workpiece, and said rocking axis passes through the region above said means to secure and occupied by said workpiece during use.

3. The machine of claim 2 wherein said rocking angle less than 180°.

4. The machine of claim 3 wherein said rocking angle is about 90°.

5. The machine of claim 2 wherein said rocking axis passes through the region to be occupied by the center of a cross-section of said workpiece.

6. The machine of claim 1 wherein said rocking axis is located to provide a cut profile with a maximum radius R less than or equal to about $28.648 \ B/\tan^{-1}(D/L)$, where B is the maximum permissible contact length, D is the deflection of the wire blades, and L is one half of the unsupported lengths of the wire blades.

7. The machine of claim 4 wherein said axis is located to provide a cut profile with a maximum radius R less than or equal to about $28.648 \ B/\tan^{-1}(D/L)$, where B is the maximum permissible contact length, D is the deflection of the wire blades, and L is one half of the unsupported lengths of the wire blades.

8. The machine of claim 1 wherein said wire blades have fixed abrasives.

9. A method of cutting wafers from a hard material comprising
providing a bladehead including a multiplicity of taut parallel wire cutting blades,
biasing said material against said bladehead with a workpiece holder, and
reciprocally moving said bladehead relative to said material along an axis parallel to said wire blades, and
rocking said workpiece holder about a rocking axis perpendicular to said blades at a frequency less than that for the reciprocation of said bladehead, to decrease the contact lengths of said blades on said workpiece and thus increase the pressure of said blades without increasing the force applied to said blades by said means for biasing.

10. The method of claim 9 wherein said wire blades have fixed abrasives.

* * * * *